United States
Roach

[11] 3,912,370

[45] Oct. 14, 1975

[54] AC DEFORMABLE MIRROR LIGHT VALVE

[75] Inventor: William Ronald Roach, Rocky Hill, N.J.

[73] Assignee: RCA Corporation, New York, N.Y.

[22] Filed: May 31, 1974

[21] Appl. No.: 475,138

[52] U.S. Cl. .................................. 350/161; 313/94
[51] Int. Cl.² .......................................... G02F 1/28
[58] Field of Search .............. 350/161; 313/94, 386

[56] References Cited
UNITED STATES PATENTS

| | | | |
|---|---|---|---|
| 2,896,507 | 7/1959 | Mast et al. ........................ | 353/85 X |
| 3,137,762 | 6/1964 | Baumgartner et al. ........... | 353/97 X |
| 3,391,297 | 7/1968 | Santilli ............................. | 313/386 X |
| 3,626,084 | 12/1971 | Wohl et al. ...................... | 350/161 X |

*Primary Examiner*—Robert Segal
*Attorney, Agent, or Firm*—Glenn H. Bruestle; Donald S. Cohen; Carl L. Silverman

[57] ABSTRACT

A deformable mirror light valve is improved by providing the deformable mirror light valve with an insulating layer which prevents injection of carriers into and removal of carriers from the photoconductor layer so as to form a substantially lag-free display with very little after image.

7 Claims, 2 Drawing Figures

AC DEFORMABLE MIRROR LIGHT VALVE

BACKGROUND OF THE INVENTION

The present invention relates to a deformable mirror light valve for use with an AC biasing system, and particularly to such a light valve having an insulating layer which permits the deformable mirror light valve to form a substantially lag-free display with very little after image.

Deformable mirror light valves are well-known devices capable of amplifying the light intensity of an optically projected image, e.g., see U.S. Pat. No. 2,896,507 entitled "Arrangement for Amplifying the Light Intensity of an Optically Projected Image," issued July 28, 1959. Generally, the devices are layered structures including a transparent conductor layer, a photoconductor layer, an elastomer layer, a thin flexible layer of conductive metal and means of applying a voltage across the transparent conductor layer and the flexible layer of conductive metal.

A light image absorbed by the photoconductor layer generates electron hole pairs. The voltage applied across the transparent conductor layer and the thin flexible metal layer causes the mobile carriers to drift in the photoconductor layer. As the oppositely charged carriers separate, a non-uniform charge pattern is formed, thereby causing the thin flexible metal layer to deform.

Although deformable mirror light valves have been used with AC biasing systems, these deformable mirror light valves suffer certain disadvantages. Often, the transparent conductor layer functions to inject carriers into or remove carriers from the photoconductor layer. For example, TIC a thin coating of tin oxide which is often utilized as a transparent conductor, will successfully block electrons and holes from being injected into the photoconductor layer, but the TIC is not successful in blocking the removal of electrons and holes from the photoconductor layer. The blocking property of a transparent conductor is a function of the energy level difference between the valence or conduction bands in the photoconductor layer chosen and the Fermi level in the transparent conductor layer. TIC is generally chosen as the transparent conductor layer for deformable mirror light valves because it is relatively transparent and because its Fermi level is located near the center of the gap between the valence and conduction bands in the photoconductor layer chosen. However, as is apparent, under an AC biasing voltage, half of the biasing time will occur with the TIC having less than desirable blocking properties.

Ideally then, the transparent conductor layer should be a blocking contact for both polarities of bias voltage, i.e., should neither inject nor remove carriers from the photoconductor layer. If the transparent conductor layer does not effectively block the injection or removal of carriers, there is a likelihood that an undesirable residual charge will be left in the photoconductor layer after the image has been written into the deformable mirror light valve. This residual charge in the photoconductor layer may decrease the contrast in the projected image. Furthermore, this residual charge may cause the mirror layer to deform after the image has been erased, thereby causing an after image to remain in the projected image. It would therefore be desirable to develop a deformable mirror light valve in which the transparent conductor layer functions as a blocking contact for both polarities of bias voltage.

SUMMARY OF THE INVENTION

A deformable mirror light valve of the type having a transparent substrate, a transparent conductor layer covering one surface of the transparent substrate, a photoconductor layer on the transparent conductor layer, an elastomer layer on the photoconductor layer and a deformable mirror on the elastomer layer is improved by providing an insulating layer disposed between the transparent conductor layer and the photoconductor layer.

DETAILED DESCRIPTION OF THE INVENTION

Figure 1:
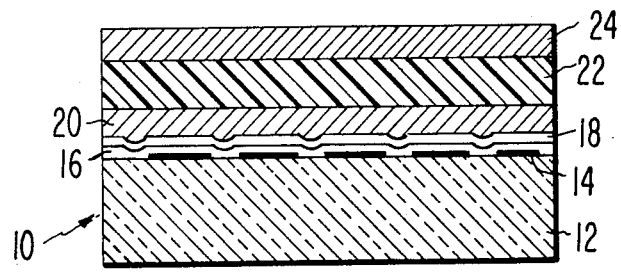
FIG. 1 is a cross-sectional view of one form of a deformable mirror light valve of the present invention.

Referring initially to FIG. 1, one form of a deformable mirror light valve of the present invention is designated generally as 10. The deformable mirror light valve 10 includes a transparent substrate 12, such as pyrex, having an optical grating 14 on one surface thereof. A chrome grating consisting of lines and spaces of equal width can serve as the optical grating 14. The optical grating 14 need not extend over the entire surface of the transparent substrate 12; it is sufficient that the grating 14 extend over the target area of the deformable mirror light valves, i.e., the area where the image is read in. A transparent conductor layer 16, such as TIC, a thin coating of tin oxide, covers both the grating 14 and the spaces defined by the grating 14. An insulating layer 18 covers the transparent conductor layer 16 and a photoconductor layer 20 covers the insulating layer 18. The deformable mirror light valve 10 of the present invention is most successful when the insulating layer 18 has a greater band gap than the band gap of the photoconductor layer 20, i.e., the insulating layer 18 has a greater energy level difference between its valence and conduction bands than the photoconductor layer 20. For example, an insulating 18 of silicon dioxide or aluminum oxide and a photoconductor layer 20 of poly(N-vinylcarbazole) doped with trinitrolfluorenone provides the proper band gap relation. An elastomer layer 22 of an electrical insulator, such as RTV silicone rubber, covers the photoconductor layer 20. The elastomer layer 22 is covered by a thin flexible conductive layer 24 herein referred to as the deformable mirror 24, which provides good optical isolation between the readout light and the address light.

The basic structure of the deformable mirror light valve of the prior art can be constructed as described in previously mentioned U.S. Pat. No. 2,896,507. The improved deformable mirror light valve 10 of the present invention can be fabricated by modifying the method of construction for the basic deformable mirror light valve of the prior art. For example, about 0.5 micron of silicon dioxide can be deposited, e.g., evaporated or sputtered, on the transparent conductor layer 16. The photoconductor layer 20, for example, 7 microns of poly(N-vinylcarbazole) doped with trinitrofluorenone, can then be deposited on the insulating layer 18. The elastomer layer 22 can be a 6 micron thick layer of a silicone rubber such as the one commercially available as RTV-602 from General Electric with 20% of a diluent, such as RTV-910, also commercially available from General Electric.

Figure 2:
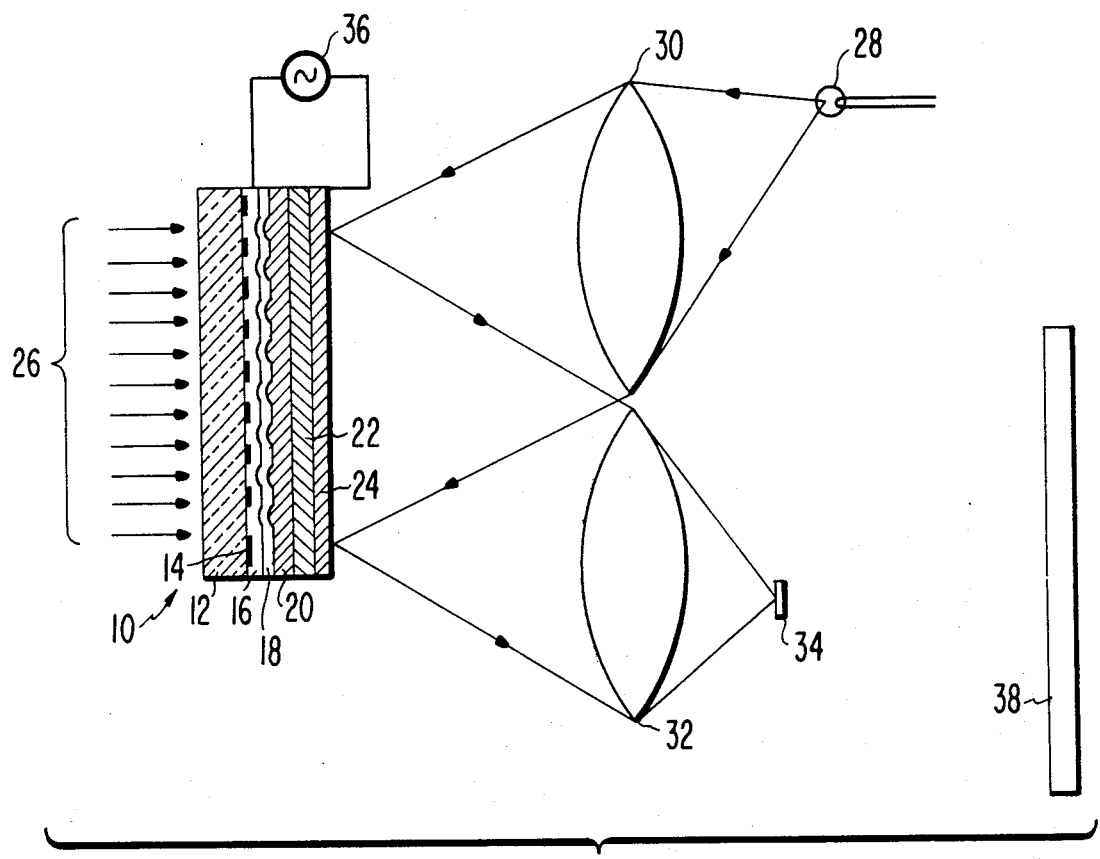
FIG. 2 is one form of a Schlieren optical system suitable for operating the deformable mirror light valve of the present invention.

The operation of the deformable mirror light valve 10 utilizes a Schlieren optical system, known in the art, such as the one described in FIG. 2. The deformable mirror light valve 10 is positioned wherein the addressing light 26 falls incident upon the substrate 12. The Schlieren optical system includes a high intensity projection lamp 28 which emits light towards a condensing lens 30 which then directs the parallel light toward the deformable mirror 24 of the deformable mirror light valve 10. The parallel light striking the mirror 24 of the deformable mirror light valve 10 is reflected through a projecting lens 32 and focused on a Schlieren stop 34 as long as the parallel light from the condensing lens 30 strikes the deformable mirror 24 while the deformable mirror 34 is flat. A biasing voltage means 36 is applied across the transparent conductor layer 16 and the deformable mirror 24 of the deformable mirror light valve 10. The biasing voltage is preferably an AC or square wave AC so as to take advantage of the carrier recombination process obtained due to the presence of the insulating layer 18. At each point where the addressing light 26 strikes the photoconductor layer 20, electron hole pairs are generated. The pairs are separated by the electric field produced by the biasing voltage, thereby causing the deformable mirror 24 of the deformable mirror light valve 10 to deform. Each deformation of the mirror 24 of deformable mirror light valve 10 causes the light reflected from the deformed mirror 24 to bypass the Schlieren stop 34 and fall upon a viewing screen 38.

The insulating layer 18 effectively electrically isolates the photoconductor layer 20 so that substantially all photogenerated charges are forced to remain in the photoconductor layer 20 while no new carriers can be introduced via the transparent conductor layer 16. Photocarriers, remaining trapped between the insulating layer 18 and the insulating elastomer layer 22 will, upon reversal of the voltage, combine with their partners, leaving no residual charge; hence, no after image. In poly(N-vinylcarbazole) doped with trinitrofluorenone, this carrier recombination process has produced projected images that are substantially lag-free. Although the deformable mirror light valve of the present invention has been described with an optical grating, the optical grating can be replaced by writing the image into the light valve in a raster pattern with a scanning beam or merely employing additional optics outside of the deformable mirror light valve. Thus, there is provided by the present invention, a deformable mirror light valve in which the transparent conductor layer functions as a blocking contact for both polarities of bias voltage.

I claim:

1. A deformable mirror light valve of the type having a transparent substrate, a transparent conductor layer covering one surface of said transparent substrate, a photoconductor layer on said transparent conductor layer, an elastomer layer on said photoconductor layer and a deformable mirror on said elastomer layer, wherein the improvement comprises:
   an insulating layer disposed between said transparent conductor layer and said photoconductor layer, said insulating layer being of a material having a greater bandgap than each of said photoconductor layer and said transparent conductor layer such that said transparent conductor is transformed into a blocking contact for both polarities of bias voltage.

2. A deformable mirror light valve in accordance with claim 1 in which said insulating layer comprises silicon dioxide.

3. A deformable mirror light valve in accordance with claim 2 in which said photoconductor layer comprises poly(N-vinylcarbazole) doped with trinitrofluorenone.

4. A deformable mirror light valve in accordance with claim 3 in which said elastomer layer comprises silicone rubber.

5. A deformable mirror light valve in accordance with claim 4 in which said transparent conductor layer comprises tin oxide.

6. A deformable mirror light valve in accordance with claim 1 in which said insulating layer comprises aluminum oxide.

7. A deformable mirror light valve in accordance with claim 1 in which the Fermi level in said transparent conductor layer is near the center of the gap between the valence and conduction bands of said insulating layer with the conduction band of said insulating layer being at a higher energy level than the conduction band in said photoconductor layer and the valence band of said insulating layer being at a lower energy level than the valence band of said photoconductor layer.

* * * * *